Patented Sept. 16, 1930

1,775,800

UNITED STATES PATENT OFFICE

ROBERT McDOWELL ALLEN, OF NEW YORK, N. Y., AND FRIEDRICH ERNST TIMMER, OF WESTFIELD, MASSACHUSETTS, ASSIGNORS TO VITAMIN FOOD CO., INC., OF NEW YORK, N. Y., A CORPORATION OF DELAWARE

PROCESS FOR THE MANUFACTURE OF YEAST PRODUCING HIGH YIELDS

No Drawing. Application filed December 14, 1925. Serial No. 75,460.

The principal object of this invention is to provide an improved procedure for the commercial production of yeast, suitable for use both for food and for the leavening of bread, in a convenient and economical manner and with higher yields than have heretofore been obtained.

Prior to the World War and to prohibition in the United States the bulk of the yeast for bakers' use was produced at the spirit and whiskey distillery. Fermentation was conducted so as to produce both alcohol and yeast. If yeast was in the larger demand the fermentation was conducted so as to produce less alcohol and more yeast and conversely when alcohol was in the larger demand. The yields, however, were not high and its production would not have been profitable without the production of alcohol.

The value of yeast as a food, particularly as a food accessory to insure a sufficient vitamin content of the diet, became well recognized during the World War, and since the war the demand for yeast as food is second only to the demand for yeast in the manufacture of bread. As the alcohol by-product of yeast growth is now salable only for industrial purposes it is necessary to obtain a high yield from a given quantity of raw material consumed, in order that the business be profitable, and the efforts of the later workers in this field have been directed to obtaining high yeast yields on the one hand and the utilization of cheap basic materials on the other, to meet this new condition.

The growth of yeast as a scientific industry commenced with the discovery of Pasteur that yeast can utilize such inorganic forms of nitrogen as ammonium salts to build up new cells. Pasteur used the ash of the grape as a source of the mineral salts, and with sugar and ammonium tartrate successfully grew yeast. His yields were not high. Following the announcement, demonstration and acceptance of his discoveries among students of fermentation, the fermentation industries began the use of ammonium, calcium, potassium, magnesium and sodium salts together with various salts of phosphorus in the distilling, brewing, winemaking and baking industries.

Following Pasteur many scientists studied this intensely interesting field and have contributed their observations to the literature on the subject. Long and short fermentations in varying medias, acid and alkaline, with and without aeration, in large and concentrated dilutions, in the brewery, the distillery, the yeast factory, and in bread-making are discussed at length. The development of the industry as it had progressed before 1910 is well summarized in the publications of Effront, Lafar, Henneberg, Kossowics, Stern, Matthews and Delbruck. The discoveries of Henneberg published in the "Wochenschrift für Brauerei" in 1908 with regard to the toxic effect of inorganic ammonium salts are among the most important of recent years. Henneberg summarized his observations with regard to inorganic ammonium salts by stating that they "are not toxic, when very small amounts of lime salts, carbonates, and bases, or larger amounts of other salts are present in the sugar solution. * * * If we consider the nature of the substances requisite to counteract their toxicity, in order to ascertain the cause of their toxic action, we find that they are chiefly substances which neutralize acids, viz., bases and carbonates. * * * We must, therefore, assume that by the decomposition of the nitrogenous compounds mentioned, free acids are liberated within the cells, which normally are immediately neutralized or rendered non-injurious by the salts mentioned. If the salts are lacking, then the acids can act as poisons".

Friedrich Hayduck of Germany has applied the teachings of Henneberg in certain processes which are described in U. S. Patents No. 1,449,102 to 1,449,114, for the production of yeast with molasses, ammonium and other salts and with an alkaline form of ammonia or an alkaline form of lime for neutralization. Hayduck utilized the alkaline salts as the key to obtaining the result described.

The Hayduck process as described in these patents is representative of the present-day commercial development of the yeast-growing industry for obtaining high yields of yeast suitable for baking purposes. The yields claimed by Hayduck are 80 pounds of yeast per 100 pounds of molasses of slow-growing or bakers' yeast, and 150 pounds of yeast per 100 pounds of molasses of quick-growing or brewers' yeast which is not readily marketable for bakers' use. In a recent suit in the U. S. district court at Baltimore under Patent No. 1,499,103, the maximum yield was stated to be about 65% of the materials consumed.

By the process described in this application we have obtained yields of yeast of from 300–400% of the sugary material used in the wort, the yeast produced being of a quality highly suitable for bakers' use.

As it has been set forth, the yeast work of recent years has centered around the use of aqua ammonia, ammonia water, calcium carbonate, sodium bicarbonate for the purpose of neutralizing the acidity in the wort which is unfavorable to yeast growth, this acidity being caused by the appropriation of the ammonia from the ammonium sulphate or the ammonium chloride and thus leaving the acid radical in the wort.

We have turned away from this method for yeast production. We have discovered that a wort into which acids or alkalies are introduced from time to time, while producing a fair yield of yeast does not constitute a favorable media for the best growth of the yeast. Such a wort is unavoidably too alkaline at one instant or too acid at another instance for the best results. We do not use calcium carbonate or soda compounds in our wort in which the yeast is propagated, and do not need to use them. By a combination of dilutions, ingredients and a degree of aeration not heretofore practiced, we obtain a yield of the best type of bakers' yeast amounting to from 300 to 400 per cent of the sugary material introduced into the wort.

Having thus stated the purpose of our invention, we will now give the process in such detail as will enable those skilled in the art to put it into practice.

A suitable yeast wort for the propagation and growth of the yeast according to the method of our present invention may be stated as follows:

Example A

Cane molasses, commonly known as black strap 1800 grams.
Ammonium sulphate 450 grams.
Tri-calcium phosphate (super-phosphate) 90 grams.
Seed yeast 50 grams.
Water 36 gals.
Wheat germ 360 grams.
Potassium and magnesium sulphate, 9 grams each, may or may not be added, depending on the need for these in the wort.

Starting with this formula the procedure is as follows: The molasses is heated to 100° centigrade for a period of one half hour in a dilution of one part molasses to four parts of water. After heating, the molasses mixture is allowed to settle for six or seven hours or other suitable length of time and is either decanted or centrifuged or other well known methods are used for the separation of the liquid from the settlings.

The wheat germ is heated at 100° with water for a period of an hour and is then cooled to the proper temperature (32° C.) ready to add to the wort. The wheat germ is preferably ground before cooking. The entire mass or a filtrate from the wheat germ may be added. It may be malted or digested by any of the well known methods before use.

The remainder of the water, after the amount used for the dilution in the cooking of the molasses and wheat germ, is placed in a fermentation tank and the wort brought to a temperature of between 32 and 35 degrees centigrade, which temperature is maintained throughout the run.

Starting, let us say, at four o'clock a. m., the molasses is added to the tank containing the water, together with 240 grams of ammonium sulphate, 90 grains of calcium phosphate and about one half of the liquid extract from the wheat germ or one half the cooked and unfiltered mass of wheat germ, it being well stirred to get an equal amount of its constituents in each portion added to the wort.

The wort is put into a tank of suitable height for the better conservation and utilization of the aeration and which in practice may be in height from 4 to 6 times the diameter. A high degree of aeration is applied, for example 100 cubic feet of air per hour per gallon of wort. The quantity of air required depends on the mode of application, particularly the velocity of the air and the thoroughness of its distribution through the wort.

Fifty pounds of seed yeast are added at the beginning of the wort and the whole as described aerated. At 7 o'clock there is added to the wort the other half of the wheat germ mixture together with 210 pounds of ammonium sulphate. The wort is continuously aerated until 5 o'clock p. m. when the wort is allowed to settle for about four hours, or whatever period necessary to settle out the yeast, when it is centrifuged and the yeast treated according to the well known method for producing compressed bakers' yeast or according to methods suitable for drying or autolyzing into a product for food purposes.

Example B

The foregoing formula for yeast-making may be practiced by adding the entire amount of ammonium sulphate and cooked wheat germ or wheat germ extract at the beginning of the wort. We have obtained very high yields when putting together all the materials in the wort at one time, but for economy in factory practice it is sometimes desirable to add the wheat germ and ammonium sulphate in two steps as described.

*Example C*

The wheat germ or other plant nitrogen may be eliminated and the process continued as in Example A. Heretofore such a mixture in different proportions and under different treatment has acted to increasingly acidify the wort to a point deleterious to yeast growth unless a neutralizing ingredient is employed. By our method, however, the molasses and ammonium sulphate can be put together and this deleterious acidity prevented by the high degree of aeration above described. When the wheat germ or other suitable plant nitrogen is added a yield of yeast is obtained ranging from 300 per cent to 400 per cent of the total molasses used. When the wheat germ or other plant nitrogen is eliminated the yield of yeast is not so great, but is larger than heretofore obtained where the acidity is corrected by neutralization.

We do not confine ourselves to these proportions nor to these materials, since we may use beet molasses or crude sugar and other grain or vegetable product instead of the wheat germ; and we may use ammonium chloride, ammonium tartrate or other similar salt of ammonia.

Instead of allowing the yeast to settle we may use any one of the well known continuous processes for the separation of the yeast as it is formed, depending upon economies in production as related to yield.

In the foregoing formula the color of the yeast produced is not of so much importance when it is to be used for making an autolyzed yeast extract, since the extract is filtered off and the residue left behind. But when the yeast is also to be used for baking purposes it may be desirable to clarify the molasses by any of the well known processes and to convert the wheat germ or other cereal or vegetable product into an extract which will contain the carbohydrate and protein material rather than adding the cooked wheat germ directly to the wort. It may also be desirable to digest the wheat germ by malting or other well known processes so as to make the starch material contained more available to the yeast. When the wheat germ or other vegetable product is malted before use the quantity of molasses may be reduced by an amount corresponding to sugary material in the malted product.

Baking tests made with yeast produced as described herein show that it is not only normal but somewhat stronger than the best grades of yeast now sold to bakers.

The expression "excess quantity of water and excess quantity of air" is used in the appended claims to designate a quantity of water in the order of 60 gallons for each 10 pounds of other ingredients in the wort and a quantity of air for aeration in the order of 100 cu. ft. of air per hour per gallon of wort. It is to be understood that the invention is not limited to the exact figures given, but that the quantities of water and air may be materially reduced and nevertheless produce commercial yields of yeast without progressive neutralization of the wort. Also the quantities may be increased without rendering the process unworkable.

We claim:

1. The process of manufacturing yeast, which comprises the preparation of a yeast wort and growing yeast therein, such yeast nutrient solution containing molasses in the proportion of approximately 1800 grams; water, approximately, 36 gallons; ammonium sulphate, approximately, 450 grams; tricalcium phosphate, approximately, 90 grams; seed yeast, approximately 50 grams, together with aeration equal approximately to 1100 cubic feet of air per gallon of wort per hour.

2. The process of manufacturing yeast, which comprises the preparation of a yeast wort and growing yeast therein, such yeast nutrient solution containing molasses in the proportion of approximately 1800 grams; water, approximately, 36 gallons; ammonium sulphate, approximately, 450 grams; tricalcium phosphate, approximately, 90 grams; magnesium sulphate, approximately, 9 grams; potassium sulphate, approximately, 9 grams; seed yeast, approximately, 50 grams, together with aeration equal approximately to 1100 cubic feet of air per gallon of wort per hour.

3. The process of manufacturing yeast, which comprises the preparation of a yeast wort and growing yeast therein, such yeast nutrient solution containing molasses in the proportion of approximately 1800 grams; water, approximately, 36 gallons; ammonium sulphate, approximately, 450 grams; tricalcium phosphate, approximately, 90 grams; seed yeast, approximately, 50 grams. together with an aeration equal approximately to 1100 cubic feet of air per gallon of wort per per hour.

4. The process of manufacturing yeast which comprises the preparation of a yeast wort containing sugary material, yeast-nourishing salts, and an excess quantity of water, adding the yeast thereto and aerating the wort during the growth of the yeast with an excess quantity of air whereby the components of the wort liberated during the operation are prevented from increasingly acidifying the wort to a point deleterious to the growth of the yeast.

5. The process of manufacturing yeast which comprises the preparation of a yeast wort containing sugary material, assimilable nitrogen, other yeast-nourishing salts and an excess quantity of water, adding the yeast thereto and aerating the wort during the growth of the yeast with an excess quantity of air whereby the components of the wort liberated during the operation are prevented from increasingly acidifying the wort to a point deleterious to the growth of the yeast.

6. The process of manufacturing yeast which comprises the preparation of a yeast wort containing molasses and a yeast-assimilable acid salt of ammonium, other yeast-nourishing salts, and an excess quantity of water, adding the yeast thereto and aerating the wort during the growth of the yeast with an excess quantity of air whereby the components of the wort liberated during the operation are prevented from increasingly acidifying the wort to a point deleterious to the growth of the yeast.

7. The process of manufacturing yeast which comprises the preparation of a yeast wort containing molasses, ammonium sulphate, calcium acid phosphate, and an excess quantity of water, adding the yeast thereto and aerating the wort during the growth of the yeast with an excess quantity of air whereby the components of the wort liberated during the operation are prevented from increasingly acidifying the wort to a point deleterious to the growth of the yeast.

8. The process of manufacturing yeast which comprises the preparation of a yeast wort containing molasses, ammonium sulphate, calcium acid phosphate, potassium sulphate and magnesium sulphate, and an excess quantity of water, adding the yeast thereto and aerating the wort during the growth of the yeast with an excess quantity of air whereby the components of the wort liberated during the operation are prevented from increasingly acidifying the wort to a point deleterious to the growth of the yeast.

9. The process of manufacturing yeast which comprises the preparation of a yeast wort containing sugary material, assimilable nitrogen made up of ammonium salts and plant nitrogen, other yeast-nourishing salts and an excess quantity of water, adding the yeast thereto and aerating the wort during the growth of the yeast with an excess quantity of air whereby the components of the wort liberated during the operation are prevented from increasingly acidifying the wort to a point deleterious to the growth of the yeast.

In testimony whereof we affix our signatures.

ROBERT McDOWELL ALLEN.
FRIEDRICH ERNST TIMMER.

CERTIFICATE OF CORRECTION.

Patent No. 1,775,800.  Granted September 16, 1930, to

ROBERT McDOWELL ALLEN ET AL.

It is hereby certified that error appears in the printed specification of the above numbered patent requiring correction as follows: Page 2, line 96, for the word "grains" read grams; page 3, line 118, claim 3, after the word "hour" and before the period insert , together with the extract from approximately 360 grams of wheat germ so as to produce a high yield of yeast of good baking strength and suitable for use as a food; and that the said Letters Patent should be read with these corrections therein that the same may conform to the record of the case in the Patent Office.

Signed and sealed this 28th day of October, A. D. 1930.

(Seal)

M. J. Moore,
Acting Commissioner of Patents.